(No Model.) 4 Sheets—Sheet 1.
C. R. GORMAN & C. J. FLETCHER.
STEERING DEVICE FOR PERAMBULATORS.
No. 377,102. Patented Jan. 31, 1888.
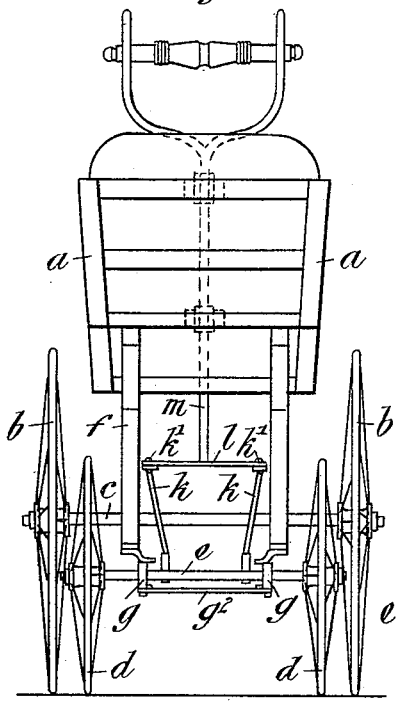
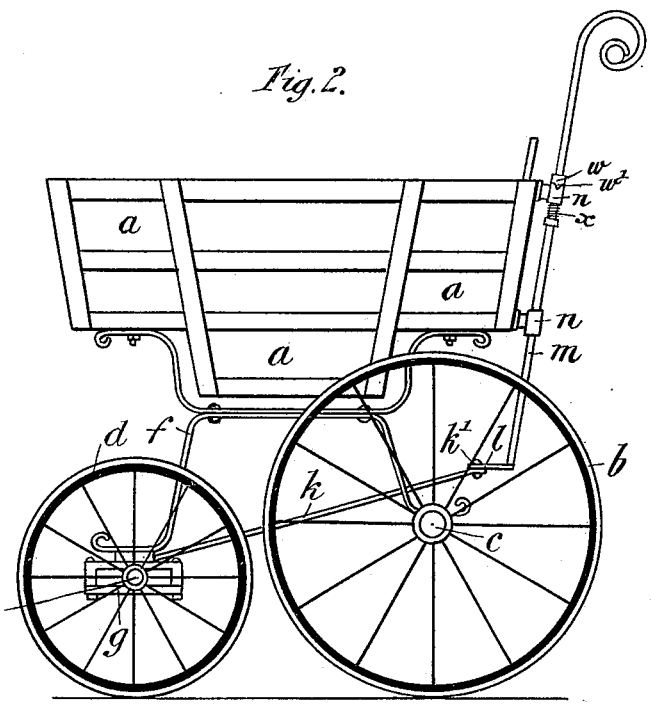
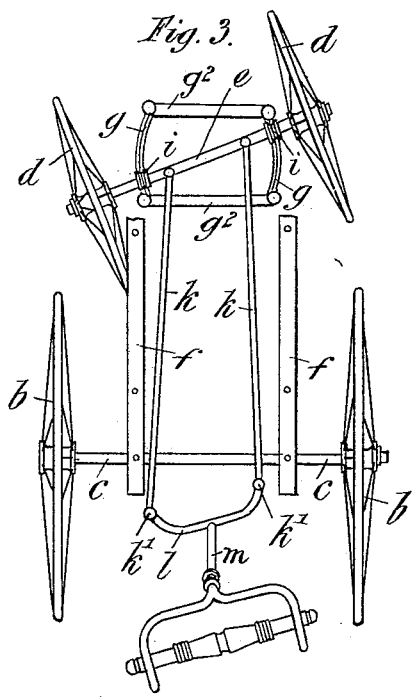
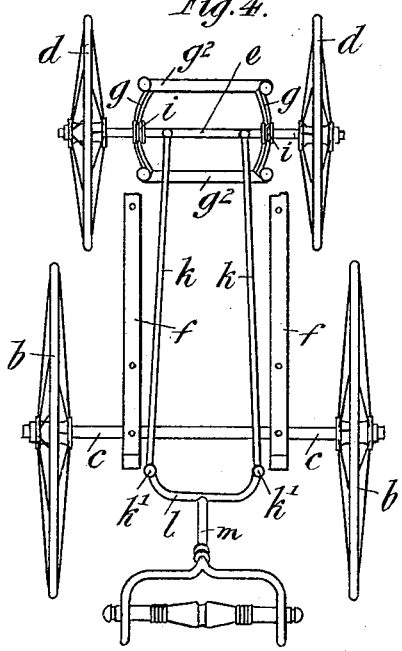
WITNESSES.
Charles Bosworth Ketley
William Charles Batten
INVENTORS.
Charles Richard Gorman
Charles Joseph Fletcher

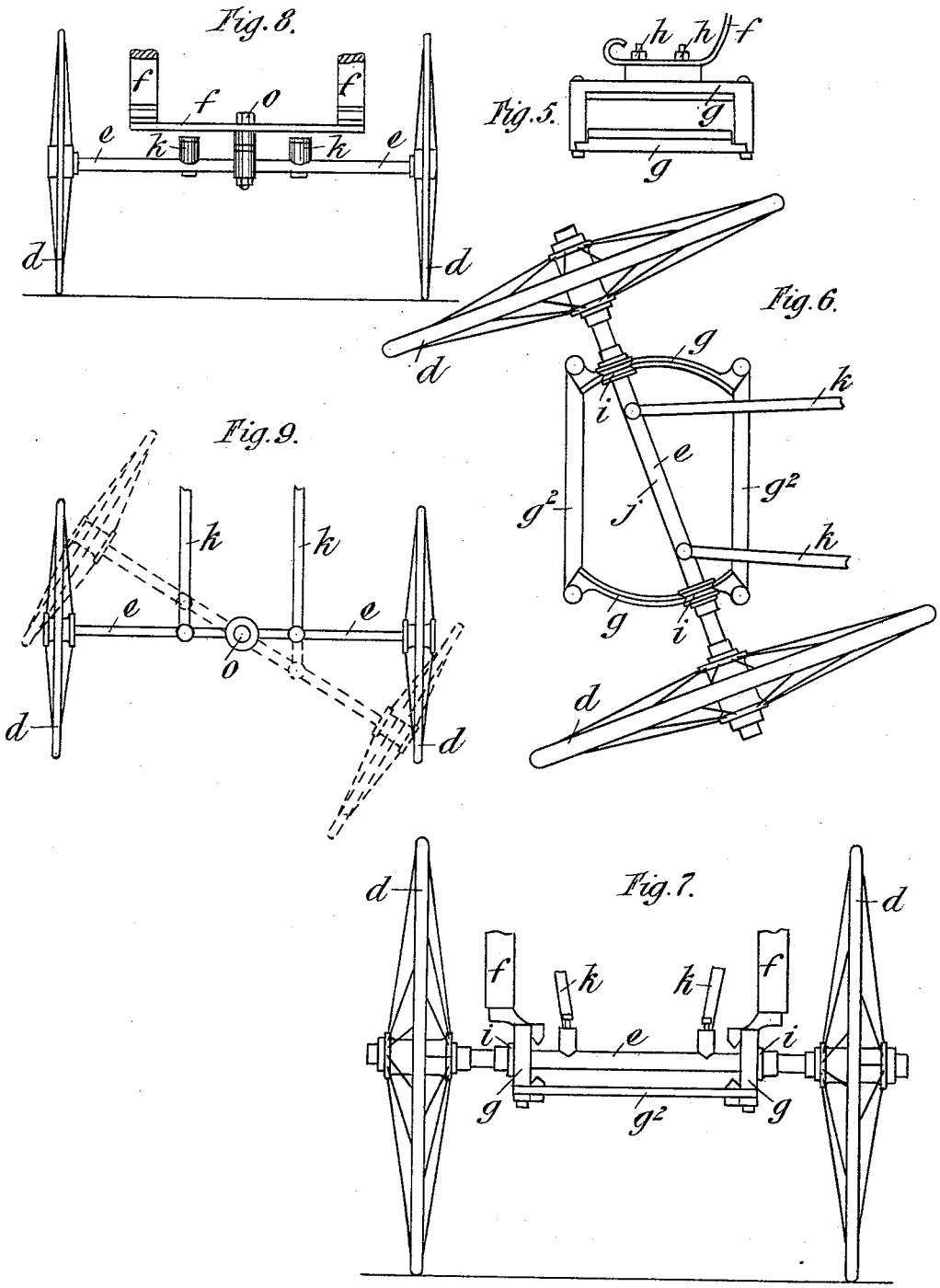

(No Model.) 4 Sheets—Sheet 3.
C. R. GORMAN & C. J. FLETCHER.
STEERING DEVICE FOR PERAMBULATORS.
No. 377,102. Patented Jan. 31, 1888.
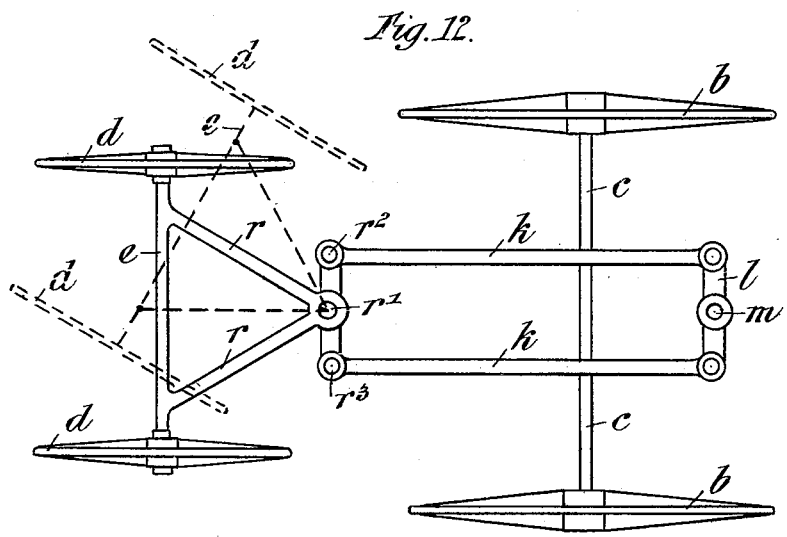
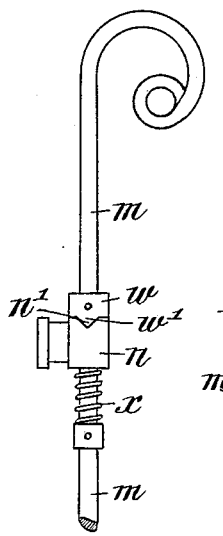
WITNESSES.
Charles Bosworth Kelley.
William Charles Batten.
INVENTORS.
Charles Richard Gorman.
Charles Joseph Fletcher.

(No Model.) 4 Sheets—Sheet 4.
C. R. GORMAN & C. J. FLETCHER.
STEERING DEVICE FOR PERAMBULATORS.
No. 377,102. Patented Jan. 31, 1888.
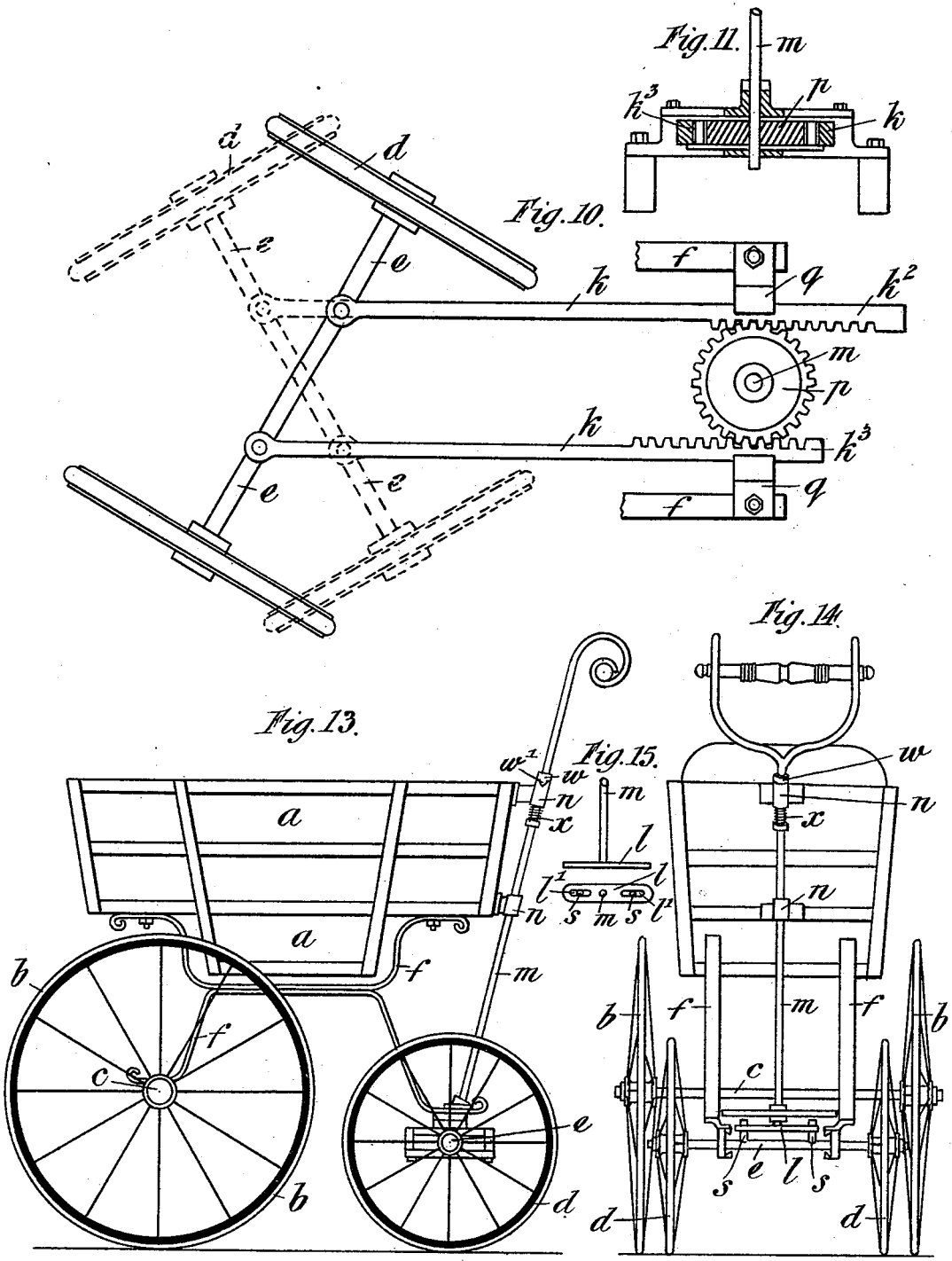
WITNESSES.
Charles Bosnorth Kelley
William Charles Batten
INVENTORS.
Charles Richard Gorman
Charles Joseph Fletcher

UNITED STATES PATENT OFFICE.

CHARLES RICHARD GORMAN AND CHARLES JOSEPH FLETCHER, OF BIRMINGHAM, COUNTY OF WARWICK, ENGLAND.

STEERING DEVICE FOR PERAMBULATORS.

SPECIFICATION forming part of Letters Patent No. 377,102, dated January 31, 1888.

Application filed May 31, 1887. Serial No. 239,867. (No model.)

*To all whom it may concern:*

Be it known that we, CHARLES RICHARD GORMAN and CHARLES JOSEPH FLETCHER, subjects of Her Majesty the Queen of Great Britain, both residing at Birmingham, in the county of Warwick, England, have invented certain new and useful Improved Means for Steering Perambulators, Invalids' Wheeled Chairs, and other like Carriages, of which the following is a specification.

The first part of our invention of improvements in perambulators, invalids' wheeled chairs, and other like carriages has reference to improved means for steering such carriages. We will first describe this part of our invention as applied to an ordinary four-wheeled perambulator, the wheels of which, when in motion, rotate in parallel planes, as their axles are connected parallel to each other. When it is desired to move such a perambulator around a curve, either the front or the back wheels have to be raised off the ground. By our invention such a perambulator can be moved and effectually steered around a curve without raising the wheels off the ground. This we accomplish by arranging for the front axle to be capable of being turned by the propelling-handle and inclined toward the back axle, as may be required, thereby allowing of the perambulator being moved around a curve without raising the wheels.

On the accompanying drawings, Figure 1 represents in front elevation, and Fig. 2 in side elevation, a four-wheeled perambulator with our invention applied. Figs. 3 and 4 are plans of the same, the body of the perambulator and the front part of the under frame and the top parts of the guides or quadrants having been removed in order to more clearly illustrate the action of the steering mechanism, as hereinafter more fully described. Fig. 5 is an elevation of the guides of the same, separately on an enlarged scale; and Fig. 6 is a plan, and Fig. 7 an end elevation, of the front wheels and curved guides of the same on an enlarged scale. Figs. 7*, 7, 7* represent details of the handle. Figs. 8, 9, 10, 11, 12, 13, 14, and 15 represent modifications.

The same letters of reference indicate the same parts in all the figures.

$a$ is the body of the perambulator.

$b\ b$ are the back wheels revolving on the axle $c$.

$d\ d$ are the front wheels revolving on the axle $e$, and $f$ is the ordinary under frame connecting the axles $c\ e$ to the body $a$. The front axle, $e$, is carried by curved guides or quadrants $g\ g$, fixed by bolts $h\ h$ to the under frame, $f$, and connected together by the cross-bars $g^2$ $g^2$. Free to turn on the axle $e$ are two rollers or slide-blocks, $i\ i$, which are grooved or flanged to suit the guides or quadrants $g\ g$, which latter are made of a similar shape, so as to prevent the axle $e$ moving endwise. The quadrants $g$ $g$ each form part of a circle of which a point, $j$, equidistant between the wheels $d\ d$, is the center.

$k\ k$ are two connecting-rods, which are jointed at $k'\ k'$ to a lever, $l$, which is fixed at its center to a handle-shaft, $m$, extending upward and free to turn in bearings $n\ n$, fixed to the body $a$, or otherwise supported therefrom, and having an ordinary perambulator-handle at its upper end. By turning the handle-shaft $m$, for instance, toward the left-hand, (see Fig. 3,) a similar turning motion is by the rods $k\ k$ transmitted from the lever $l$ to the front axle, $e$, which, with its wheels, is correspondingly turned and the perambulator steered toward the left hand. By turning the handle in the opposite direction the axle $e$ will be turned in the opposite direction also, and the perambulator steered toward the right hand.

In order that the perambulator may be automatically steered in a straight line or comparatively straight line without requiring attention on the part of the attendant, we provide on the handle-shaft $m$ a cam, $w$, having at each side a V-shaped projecting part, $w'$, which, when the front axle, $e$, is in its normal position parallel to the back axle, (see Figs. 2, 4, and 7*,) fit in V-shaped recesses $n'$ in the upper bracket, $n$, where they are maintained by the spiral spring $x$, which presses the handle-shaft downwardly. When the handle-shaft $m$ is turned on its axis to steer the perambulator to the right or left hand, (see Figs. 3 and 7**,) either one or other of the inclined sides of the V-shaped projection $w'$ acts upon the said projection and compresses the spring $x$, which latter, when the handle is released, causes the V-shaped projection $w'$ to regain its normal position in the recess $n'$ and the perambulator to be automatically steered in a straight line.

The steering apparatus above described, by means of which the front wheels can be caused to turn by the back handle, as above described, is intended as a type only, as various equivalent arrangements of mechanism may be substituted therefor without departing from the spirit of our invention. For instance, as illustrated in elevation by Fig. 8 and in plan by Fig. 9, the curved guides or quadrants $g\ g$ may be dispensed with, and instead thereof the said front axle, $e$, may be pivoted and arranged to turn on a central pin, $o$, fixed to the under frame, $f$, or to the body of the perambulator, the rods $k\ k$ being pivoted thereto, as above described; and instead of the lever $l$ at the bottom of the handle shaft $m$, for transmitting motion therefrom to the axle $e$, a spur-pinion, $p$, may be employed, (see plan, Fig. 10, and sectional end elevation, Fig. 11,) gearing into two racks, $k^2\ k^3$, formed, respectively, on the connecting-rods $k\ k$, suitable guides, $q\ q$, fixed to the under frame, $f$, being provided for the racks to work in, so as to keep them in gear with the pinion $p$; or, as illustrated in plan by Fig. 12, the axle $e$ may be carried by a fork, $r$, which is pivoted at $r'$ to the under frame, and to which the rods $k\ k$ are pivoted at $r^2\ r^3$; and it will be evident that although the two connecting-rods $k\ k$ make the best arrangement, still one of them might be dispensed with and the axle $e$ operated by a single rod only.

Other like four-wheeled carriages—such, for instance, as bath-chairs, invalid-carriages, and hand parcel-carts—can be arranged to be steered from behind similarly as above described, and as illustrated by Figs. 1 to 12, both inclusive, with reference to a four-wheeled perambulator, such alterations only being necessary in the shape and arrangement of the parts as will adapt them to the particular carriage with which they are used.

As a modification of this part of our invention the front axle of the perambulator or other like carriage may be fixed and the back axle arranged to turn by the back handle similarly as above described with reference to the front axle. This modification may be carried out as illustrated in side elevation by Fig. 13 and in back elevation by Fig. 14 and by Fig. 15, which latter shows in plan and elevation the lever at the bottom part of the handle separately. This perambulator is similar in all respects to that above described and illustrated by Figs. 1 to 7***, both inclusive, except that it is turned round end for end, the large wheels being at the front and the handle-shaft $m$ being fixed directly over the moving axle $e$, the rods $k\ k$ being dispensed with, the motion of the lever $l$ being transmitted to the axle $e$ by two pins, $s\ s$, which are fixed to the axle $e$ and engage in slotted holes $l'\ l'$ in the lever $l$.

In conclusion, we wish it to be understood that we do not limit ourselves to the precise details herein described and illustrated in the accompanying drawings, as the same may be varied without departing from the nature of our invention; but, Having now particularly described and ascertained the nature of our said invention and in what manner the same is to be performed, we declare that what we claim is—

1. The combination, in a perambulator, of quadrant guides held in a suitable frame, the front axle resting on said quadrant and guided thereby, and operating-handles, and connections between the handles and the axle for steering the vehicle, substantially as described.

2. The combination, in a perambulator, of front guiding-wheels mounted on a pivoted axle, connections to a steering-handle, and a spring-clutch for returning the handle-bar and axle to their normal positions parallel with the fixed axle, so as to automatically steer the perambulator in a straight line.

In testimony whereof we have each signed in the presence of two subscribing witnesses.

CHARLES RICHARD GORMAN.
CHARLES JOSEPH FLETCHER.

Witnesses:
CHARLES BOSWORTH KETLEY,
WILLIAM CHARLES BATTEN.